(12) United States Patent
Edpalm et al.

(10) Patent No.: US 11,989,869 B2
(45) Date of Patent: May 21, 2024

(54) METHOD AND DEVICE FOR DETERMINING AUTHENTICITY OF A VIDEO

(71) Applicant: Axis AB, Lund (SE)

(72) Inventors: Viktor Edpalm, Lund (SE); Song Yuan, Lund (SE)

(73) Assignee: AXIS AB, Lund (SE)

( * ) Notice: Subject to any disclaimer, the term of this patent is extended or adjusted under 35 U.S.C. 154(b) by 292 days.

(21) Appl. No.: 17/380,127

(22) Filed: Jul. 20, 2021

(65) Prior Publication Data
US 2022/0067909 A1  Mar. 3, 2022

(30) Foreign Application Priority Data

Aug. 28, 2020 (EP) ..................................... 20193417

(51) Int. Cl.
*G06K 9/00* (2022.01)
*G06T 1/00* (2006.01)
(Continued)

(52) U.S. Cl.
CPC .......... *G06T 7/0002* (2013.01); *G06T 1/0028* (2013.01); *G06T 7/20* (2013.01);
(Continued)

(58) Field of Classification Search
CPC ....... G06T 7/0002; G06T 7/20; G06T 1/0064; G06T 1/0021; G06T 2207/10016;
(Continued)

(56) References Cited

U.S. PATENT DOCUMENTS 9,082,018 B1 * 7/2015 Laska .............. G08B 13/19606
10,922,438 B2 * 2/2021 Frederick .............. H04L 63/123
(Continued)

FOREIGN PATENT DOCUMENTS

CN         107909063 A      4/2018
JP       2012137861 A   *  7/2012
WO   WO-2018058321 A1 *  4/2018   ......... G06K 9/00711

OTHER PUBLICATIONS

J. Galbally, S. Marcel and J. Fierrez, "Image Quality Assessment for Fake Biometric Detection: Application to Iris, Fingerprint, and Face Recognition," in IEEE Transactions on Image Processing, vol. 23, No. 2, pp. 710-724, Feb. 2014, doi: 10.1109/TIP.2013.2292332. (Year: 2014).*

(Continued)

*Primary Examiner* — Emily C Terrell
*Assistant Examiner* — Kevin M Coomber
(74) *Attorney, Agent, or Firm* — Volpe Koenig

(57) ABSTRACT

A method for determining authenticity of a video in a surveillance system, whereby a sequence of image frames of a scene is captured, and an object is tracked. A current image quality measure in an image area corresponding to the tracked object is determined in at least a first and second image frame. chosen such that the object has moved at least a predetermined distance between the first and second image frames. A current image quality measure variation for the object is determined, the image quality measure variation describing the image quality measure as a function of position of the object in the image frames. The current image quality measure variation is compared to a known image quality measure variation. In response to the current image quality measure variation deviating from the known pixel density variation by less than a predetermined amount, it is determined that the video is authentic.

13 Claims, 6 Drawing Sheets

(51) Int. Cl.
*G06T 7/00* (2017.01)
*G06T 7/20* (2017.01)

(52) U.S. Cl.
CPC ............ *G06T 2207/10016* (2013.01); *G06T 2207/30168* (2013.01); *G06T 2207/30232* (2013.01)

(58) Field of Classification Search
CPC ........ G06T 2207/30232; G06T 1/0028; G06V 20/44; G06V 10/993; G06V 20/52; G06V 20/40; G08B 13/1961; G08B 13/19663; G06F 18/22; G06F 21/64; G06F 21/16; H04N 19/136
See application file for complete search history.

(56) References Cited

U.S. PATENT DOCUMENTS

| 11,049,261 | B2* | 6/2021 | Tang | H04N 21/8549 |
| 2006/0020830 | A1 | 1/2006 | Roberts | |
| 2008/0192980 | A1* | 8/2008 | Park | G07C 9/37 382/103 |
| 2016/0148066 | A1* | 5/2016 | Duenias | H04N 23/745 382/115 |
| 2018/0012094 | A1* | 1/2018 | Wu | G06T 7/90 |
| 2020/0193585 | A1* | 6/2020 | Ikegami | G06N 20/00 |
| 2021/0279469 | A1* | 9/2021 | Holland | G06F 21/64 |

OTHER PUBLICATIONS

Extended European Search Report dated Feb. 9, 2021 for European Patent Application No. 20193417.1.
Galbally et al., "Image Quality Assessment for Fake Biometric Detection: Application to Iris, Fingerprint, and Face Recognition," in IEEE Transactions on Image Processing, vol. 23, No. 2, pp. 710-724, (Feb. 2014).
Pinto et al., "Video-Based Face Spoofing Detection through Visual Rhythm Analysis," 2012 25th SIBGRAPI Conference on Graphics, Patterns and Images, pp. 221-228 (2012).
Albakri et al., "The Effectiveness of Depth Data in Liveness Face Authentication Using 3D Sensor Cameras," Sensors, 19(8):1928 (2019).
Pinto et al., "Video-Based Face Spoofing Detection through Visual Rhythm Analysis," XXV SIBGRAPI Conference on Graphics, Patterns and Images, slides 1-39 (2012).
Raval et al., "Face spoofing detection using Image Distortion features," International Journal of Innovative Research in Science, Engineering and Technology, vol. 6, Issue 9 (Sep. 2017).
Karthik et al., "Face anti-spoofing based on sharpness profiles," 2017 IEEE International Conference on Industrial and Information Systems (ICIIS), pp. 1-6, (2017).
Li et al. "Replayed Video Attack Detection Based on Motion Blur Analysis," IEEE Transactions on Information Forensics and Security. pp. 1-1 (2019).

* cited by examiner

METHOD AND DEVICE FOR DETERMINING AUTHENTICITY OF A VIDEO

FIELD OF INVENTION

The present invention relates to determining the authenticity of a captured video. In particular, it relates to determining the authenticity of video in a surveillance system.

TECHNICAL BACKGROUND

It used to be said that the camera never lies. However, as technology advances, unfortunately so do the attempts to forge the information created by that technology. In the surveillance or monitoring context, techniques have been developed for preventing such forging attempts and for detecting when forging attempts are made. One such technique is to add a digital signature to the captured video before it is transmitted from the camera. At the receiving end, the signature can be verified in order to determine if the received video is the same as the video transmitted by the camera. In this way, forging attempts somewhere between the camera and the receiver can be discovered. There are many ways of applying the signature. For instance, it may take the form of a digital watermark, modifying pixel values in image frames of the video in accordance with a particular pattern, usually in a way that the alterations are not visible to the naked eye. Another way of applying the signature is to store it as metadata in a header of the image frames.

Even if digital signatures make it possible to ensure that the received video has not been tampered with after it was transmitted from the camera, this does not guarantee that the received video is a true representation of events in the scene that was monitored by the camera. With increasing image quality from displays, it may be possible to trick a viewer of a captured video by having the camera capture video not of the actual scene, but of a display placed before the camera. A digital signature applied by the camera will in such a scenario tell the viewer that the video is authentic, because it has not been tampered with after it was captured and transmitted, thus possibly imparting a false sense of authenticity.

A need therefore remains for a solution to the problem of preventing or detecting forgery in the shape of such replayed video attacks.

SUMMARY

Providing a method of determining the authenticity of a video, and particularly in a surveillance system would be beneficial.

Additionally, a method of determining that the events captured in a video are events that occurred in the scene that was monitored by the camera would also be beneficial.

Further providing an authenticator system that makes it possible to determine the authenticity of a video would be beneficial.

Yet another object is to provide a camera and a computer-readable storage medium allowing determination of the authenticity of a video.

According to a first aspect, a method for determining authenticity of a video in a surveillance system comprises: capturing a sequence of image frames of a scene, tracking an object in the sequence of image frames, determining a current image quality measure in an image area corresponding to the tracked object in at least a first image frame and a second image frame of the image frames in which the object is tracked, wherein the first and second image frames are chosen such that the object has moved at least a predetermined distance between the first and second image frames, identifying a current image quality measure variation for the object from the determined image quality measure in the first image frame and the second image frame, the image quality measure variation describing the image quality measure as a function of position of the object in the first and second image frames, comparing the current image quality measure variation to a known image quality measure variation, and in response to the current image quality measure variation deviating from the known pixel density variation by less than a first predetermined amount, determining that the video is authentic. Such a method makes it possible to determine if a captured video is likely to depict events occurring in the monitored scene, rather than events occurring on a display placed in the scene. As a display is flat, objects moving in a displayed video will not exhibit the same image quality changes as objects moving in the scene. For instance, a person moving around in the scene will sometimes be closer to the focus distance of the camera and sometimes further from that focus distance, such that the person will sometimes be in focus and sometimes out of focus. However, a person moving in a displayed video will always be at the same distance from the camera, namely the distance from the camera to the display. Therefore, even if the person in the displayed video appears to be moving towards or away from the camera, the distance in relation to the focus distance of the camera will remain constant. By comparing variations in an image quality measure as the tracked object moves with expected variations of that image quality measure it may be determined if the object is likely to be moving in the scene or if it is instead likely to be moving on a display. Returning to the example of focus, a person moving in the scene from a point very close to the camera, past the focus distance of the camera and further away from the camera would be expected to first be out of focus, then in focus, and then out of focus again. If the person is instead moving in a video displayed on a screen in front of the camera, the screen's distance from the camera will remain constant and the person will therefore remain at the same relative focus, be that in or out of focus. As will be discussed further, focus is just one example of an image quality measure whose variation may be studied for determining the authenticity of the captured video.

For being able to study the variation of the image quality measure in the image area corresponding to the tracked object, the object needs to move at least a predetermined distance. This may translate to a distance in the scene, but it is more important that the object has moved a long enough distance in the image. The distance may be in any direction, such as across the scene, downwards, upwards, or towards or away from the camera. The movement distance may also be caused by an apparent movement, such as when the camera zooms, or when a movable camera pans or tilts. The predetermined distance may be different for different movement directions and it may be different for different image quality measures. Furthermore, the predetermined distance may be different in different areas of the image. For instance, the impact of lens distortion need not be linear, such that a shorter movement distance is sufficient closer to the centre of the image compared to at the periphery of the image, or vice versa. As another example, focus changes more quickly at varying distances close to the camera than further away from the camera.

For each image frame, the current image quality measure in the image area corresponding to the tracked object may be determined, regardless of whether the object has moved a long enough distance. However, for the identification of the variation of the image quality measure, the image frames for which the current image quality measure is taken have to represent a sufficiently long movement of the object.

The image quality measure is at least one from the group consisting of pixel contrast, focus, motion blur, pixel range fill, and noise level.

In a variant of the method, the current image quality measure variation is identified from the determined image quality measure in three or more image frames, including the first and second image frames. Using more image frames may generally provide a clearer impression of the variation than using just two. It may in many cases be useful to use around 100 frames, corresponding to one or a few seconds of video.

In some variants of the method, two or more different image quality measures may be studied. Thus, the step of determining a current image quality measure in an image area corresponding to the tracked object may comprise determining a first current image quality measure and a second current image quality measure, the second current image quality measure being different from the first current image quality measure, the step of identifying a current image quality measure variation may comprise identifying a first current image quality measure variation from the first determined image quality measure in the first image frame and the second image frame and identifying a second current image quality measure variation from the second determined image quality measure in the first image frame and the second image frame, and the step of comparing the current image quality measure variation to a known image quality measure variation may comprise comparing the first current image quality measure variation to a first known image quality measure variation and comparing the second current image quality measure variation to a second known image quality measure variation. This may provide better certainty in determining the authenticity of the video as it is less likely that a displayed video will behave in accordance with the known variations of two or more different image quality measures than of just one image quality measure.

In response to the current image quality measure variation deviating from the known image quality measure variation by more than a second predetermined amount, the method may comprise issuing an alert indicative of a possible replayed video attack. Thus, not only does the method provide a way of determining the authenticity of a video, but also a way of warning a user that the video may not depict the actual scene the camera is supposed to monitor. The second predetermined amount may be the same as the first predetermined amount, such that the result of the method will be either an indication that the video is authentic or an indication that it is potentially fake. Alternatively, the second predetermined amount may be larger than the first predetermined amount such that the outcome of the authentication method may be either an indication that the video is authentic, an indication that the video is potentially fake, or an ambiguous outcome therebetween. The user may be informed that it was not possible to determine with sufficient reliability that the video is either authentic or potentially the result of a playback attack, either by an explicit indication that the authenticity of the video could not be determined, or by a lack of an indication that the video was found to be either authentic or forged.

The method may further comprise storing the determined image quality measures in the video sequence. In this way, the authenticity of the video may be determined at a later time.

The determined image quality measure may be stored in a header of the respective image frame.

Variants of the method may further comprise storing the video sequence, retrieving the stored video sequence, and performing the step of comparing the current image quality measure variation to a known image quality measure variation on the retrieved video sequence. Thus, the authenticity of the video need not have been determined at the time of capture but can be determined later if the authenticity comes into question. Thereby, computing resources may be saved at the time of capture. Determining and storing image quality measures at the time of capture may make a later authentication more secure than if the image quality measures were also determined later, when the authenticity comes into question, as compression of the video may otherwise impact the image quality measures.

In some variants, the method may further comprise in response to determining that the video is authentic, applying a first signature to the video sequence, and in response to not determining that the video is authentic, applying a second signature to the video sequence, the second signature being different from the first signature. The use of different signatures may be a convenient way of informing a user of the outcome of the authentication method.

According to a second aspect, the abovementioned authenticator system for determining authenticity of a video in a surveillance system comprises circuitry configured to execute: a capturing function configured to capture a sequence of image frames of a scene, a tracking function configured to track the object in the sequence of image frames, a determining function configured to determine a current image quality measure in an image area corresponding to the tracked object in at least a first image frame and a second image frame of the image frames in which the object is tracked, wherein the first and second image frames are chosen such that the object has moved at least a predetermined distance between the first and second image frames, an identifying function configured to identify a current image quality measure variation for the object from the determined image quality measure in the first image frame and the second image frame, and a comparing function configured to compare the current image quality measure variation to a known image quality measure variation, and in response to the current image quality measure variation deviating from the known pixel density variation by less than a predetermined amount, determining that the video is authentic. With this authenticator system, it is possible to determine the authenticity of a video in an efficient way. The authenticator system makes it possible to determine whether it is more likely that the video depicts events in the monitored scene or if it is more likely that it depicts a video displayed on a display placed in front of the camera. By comparing how an image quality measure varies as a function of the position of the tracked object with a known behaviour of the image quality measure, it is possible to assess whether the object is moving in the monitored scene or if it might instead be moving in a displayed video. As noted above in the context of the first aspect, an object moving in a displayed video will to the camera monitoring the scene appear as being at a constant distance from the camera, i.e., the distance from the camera to the display. Thus, changes in the image quality measure that would be expected to occur because the object moves in relation to the camera will not occur. As the skilled person will realise, there may indeed be changes in the image quality measure also for a tracked object in a displayed video, but those changes will instead be caused by the movement of the object in relation to the camera that captured the displayed video, not the camera capturing the scene containing the display displaying that video. The image quality measure is at least one from the group consisting of pixel contrast, focus, motion blur, pixel range fill, and noise level.

The authenticator system of the second aspect may be embodied in essentially the same ways as the method of the first aspect, with accompanying advantages.

According to a third aspect, the abovementioned teachings are achieved, in full or at least in part, by means of a camera comprising an authenticator system according to the second aspect.

According to a fourth aspect, the abovementioned teachings are achieved, in full or at least in part, by means of a non-transitory computer readable storage medium having stored thereon instructions for implementing the method according to the first aspect, when executed on a device having processing capabilities.

A further scope of applicability of the present teachings will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that is the concepts are not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The description will be set forth in more detail hereinafter by way of example and with reference to the accompanying schematic drawings, in which.

DETAILED DESCRIPTION OF EMBODIMENTS

Figure 1:
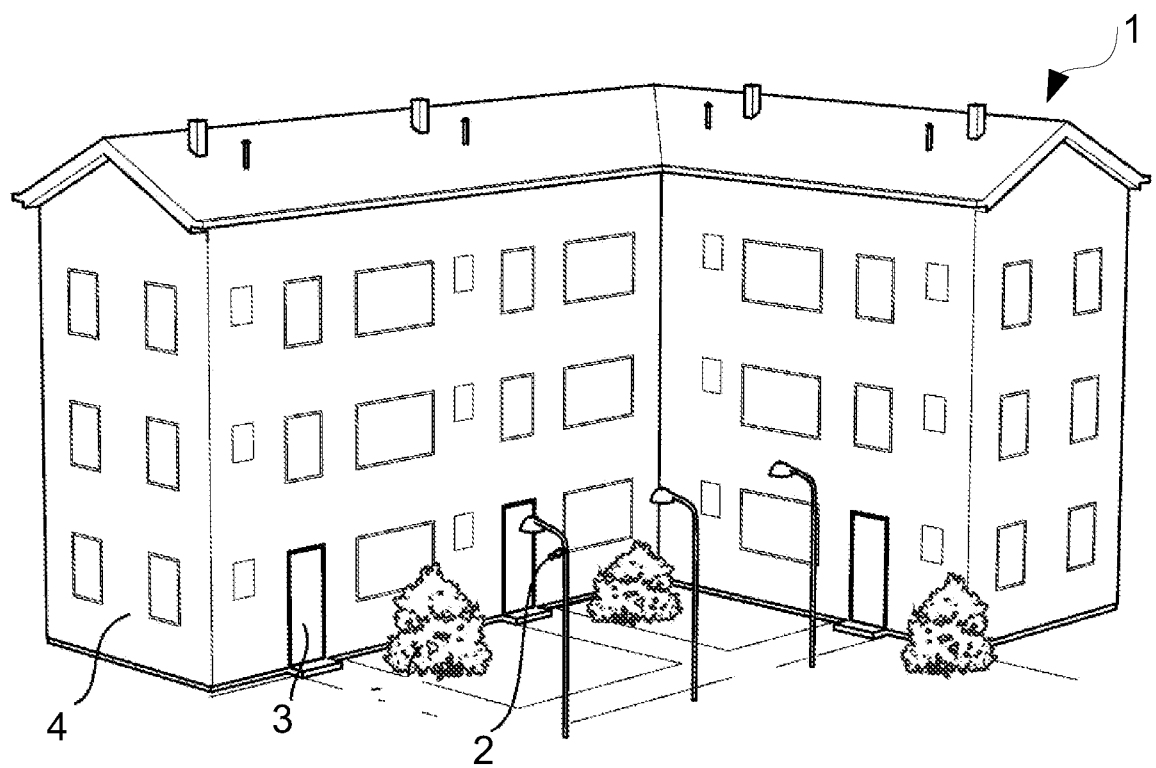
FIG. 1 is a perspective view of a scene monitored by a camera.

In FIG. 1, a scene 1 is shown which is monitored by a camera 2. With the help of the camera 2, it is possible to monitor, e.g., the area around an entrance 3 to a building 4.

Figure 2:
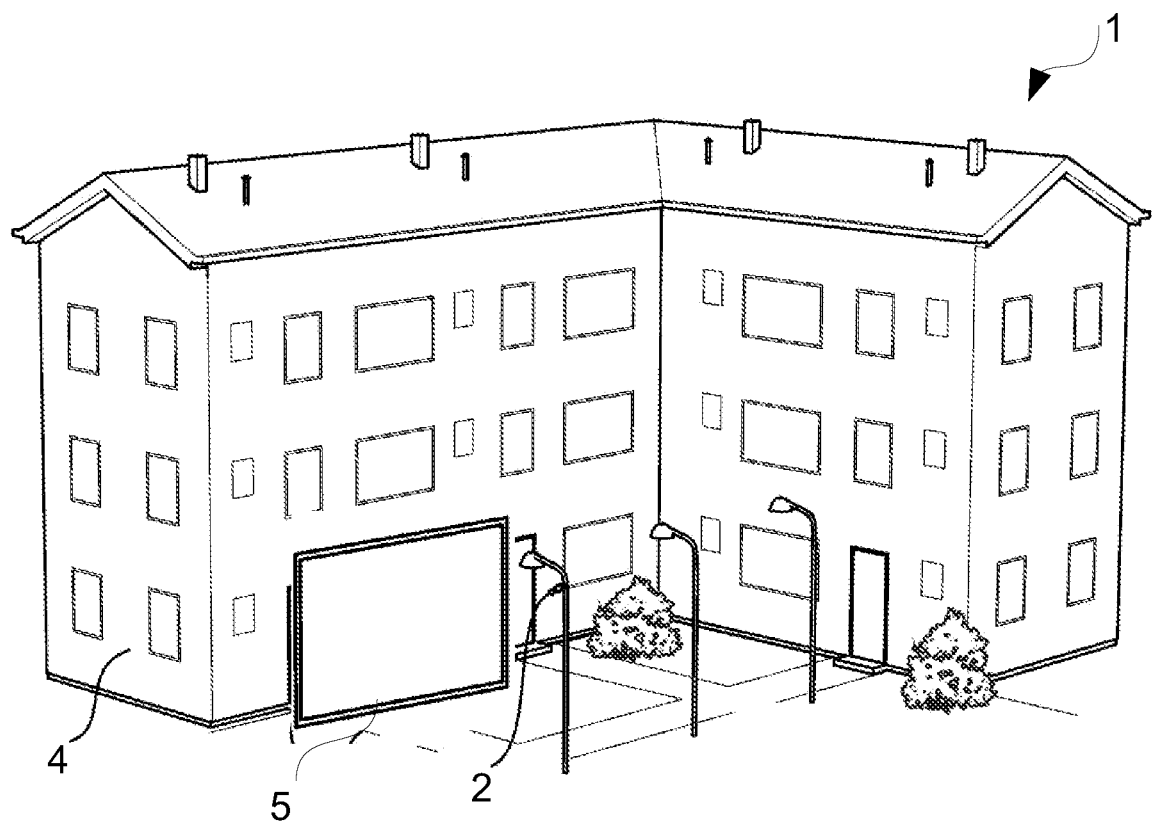
FIG. 2 is a perspective view of the scene in FIG. 1 with a display placed in front of the camera.

In FIG. 2, the same scene 1 as in FIG. 1 is shown but here, a video display 5 has been placed in the scene. The display 5 is placed in front of the camera 2, such that instead of capturing images of the entrance 3 to the building 4, the camera 2 will now capture images of the display 5.

Figure 3A:
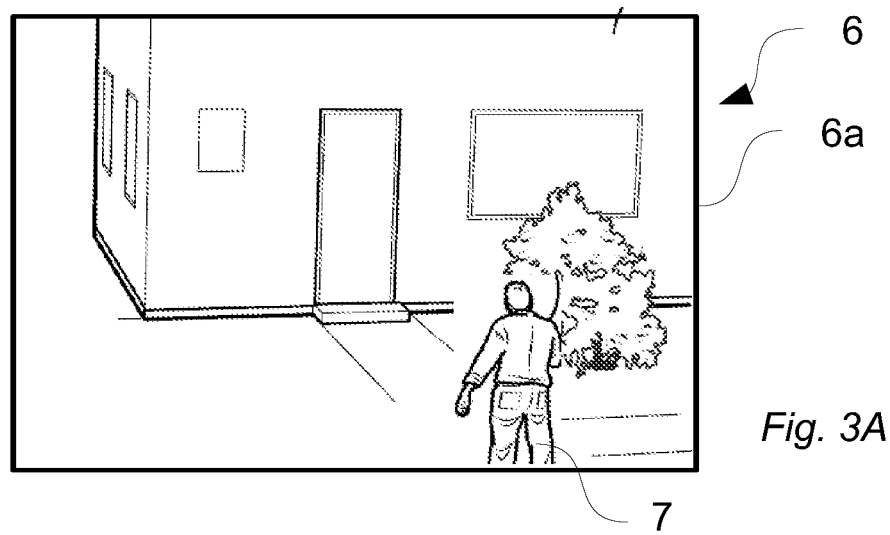
FIGS. 3A-3C show a series of images captured by the camera in FIG. 1 or FIG. 2.

FIG. 3 shows three images 6 in a video sequence captured by the camera 2. The images 6a, 6b, 6c depict a person 7 walking towards the entrance 3. It is not immediately apparent from the images 6a-c if the video represents what happened in the actual scene or if it represents something that was displayed on a display 5. In order to solve the problem of determining if the video is authentic or not, variations in one or more image quality measures should be studied as a function of the position of a tracked object. In the following, the method and system for authenticating video will be described by way of examples with reference initially to FIGS. 1-3.

The camera 2 is a digital camera that employs visible light to capture a sequence of image frames 6. An object is tracked in the image sequence. In this example, the tracked object is the person 7. Many object tracking methods are known to the skilled person and the tracking in itself will therefore not be discussed in detail here.

Figure 3B:
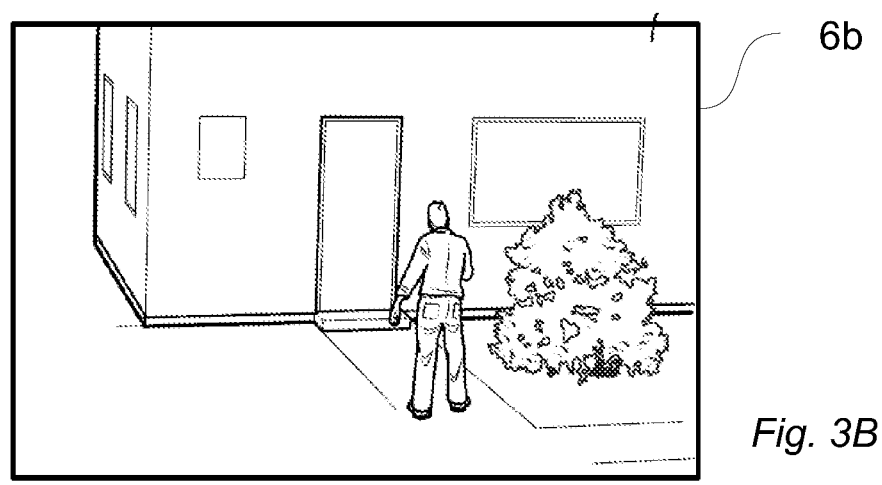
Figure 3C:
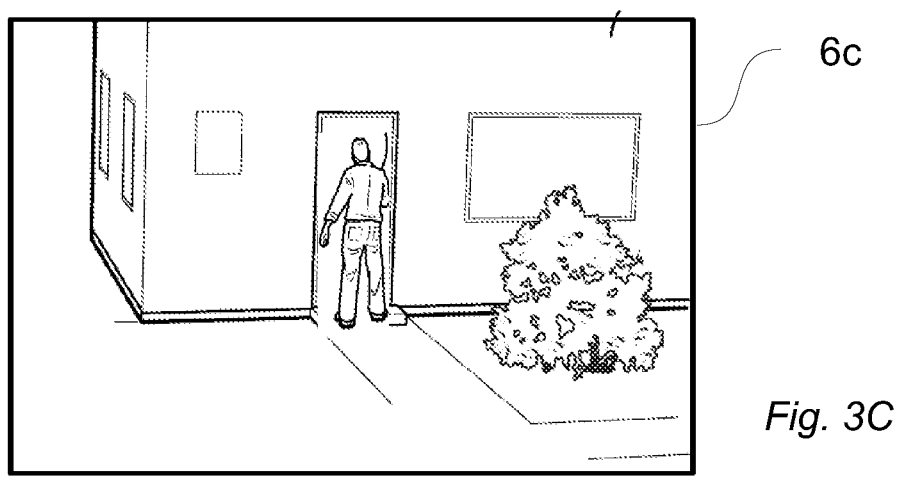

As the person 7 moves in relation to the camera 2, one or more image quality measures vary as a function of the position of the person. For instance, in FIG. 3A, the person 7 is close to the camera 2. In this example, the focus of the camera is fixed and set further away from the camera 2, somewhere between the camera 2 and the entrance 3. Therefore, the person 7 should at first be out of focus. In FIG. 3B, the person has moved away from the camera, towards the entrance and is now in a position in the scene that corresponds to the focus distance of the camera 2. The person 7 is therefore expected to be in focus. The tracked person 7 continues towards the door and has in FIG. 3C almost reached the entrance 3. This position is beyond the focus distance of the camera 2 and the person should therefore be out of focus again.

With knowledge of the focus setting of the camera 2 and the behaviour of the lens, such as the depth of field at varying focus settings, it is possible to find how the focus should change with varying distance between object and camera. This known variation can then be compared to how the focus varies in the captured image sequence. In each image frame 6a-c, a current image quality measure is determined in an image area corresponding to the tracked object. Thus, in this example, a focus value is determined in the image area of the person 7 in each frame 6a-c. The focus value may be determined in any known way. Based on the determined focus values, a current focus variation is identified. This variation may be based on the image quality measure determined in just two or a few image frames but may advantageously be based on a longer sequence of successive image frames.

Figure 4:
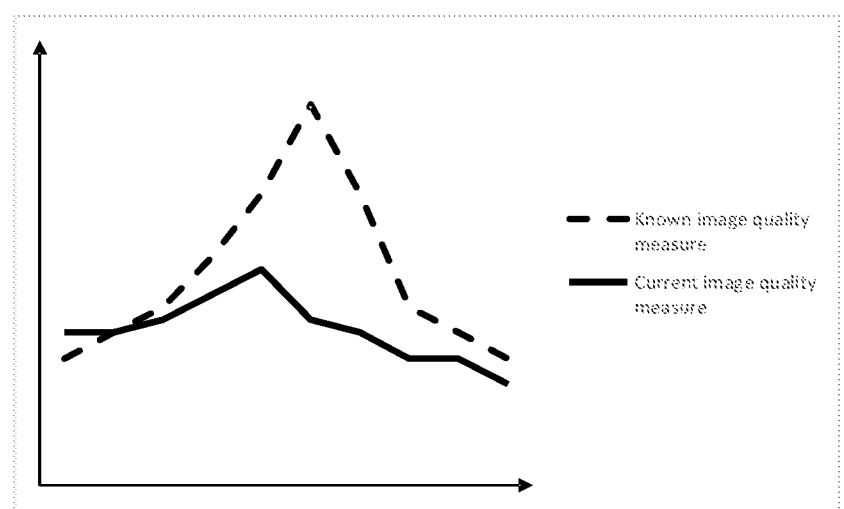
FIG. 4 is a graph showing an example of a current image quality measure variation and a known image quality measure variation.

FIG. 4 is a simplified illustration of an example of how an image quality measure, such as focus, varies in the captured images and how the same image quality measure is expected to vary based on knowledge of the camera and its components. The x axis represents a position of the tracked object in the image frame and the y axis represents values of the image quality measure that is being studied. It should be noted that the values plotted in FIG. 4 are for illustration only and do not necessarily represent any real image quality measure.

The variation of the focus value for the tracked object in the captured image frames is compared to the expected or known variation. This comparison may be made by performing an image analysis on a curve describing the current variation and a curve describing the known variation, such as an edge detection analysis calculating local sums of the strength of edges. The comparison may alternatively be made by calculating a sum of absolute differences for a plurality of points in the current variation and in the known variation. As part of the comparison, a calibration or standardisation of the current variation may be made with reference to the known variation, or vice versa.

If the outcome of the comparison is that the current image quality measure variation, or in this example the focus value variation, differs from the expected or known variation by less than a first predetermined amount, it is determined that the video is authentic.

If, on the other hand, the outcome of the comparison is that the current image quality measure variation differs from the expected or known variation by more than the first predetermined amount, it will not be determined that the video is authentic. The method may in such instance end with such an inconclusive outcome or it may be determined that if it has not been possible to determine that the video is authentic, then the video is potentially inauthentic or fake. Alternatively, the difference between the current image quality measure variation and the known variation may be checked against a second predetermined amount which is larger than the first predetermined amount and if the current image quality measure variation differs from the known image quality measure variation by more than that second predetermined amount, it may be determined that the video is potentially fake. Should the current image quality measure variation differ from the known image quality measure variation by more than the first predetermined amount but less than the second predetermined amount, the comparison will be inconclusive, and it cannot be determined whether the video is authentic or potentially fake.

If it has been determined that the video is authentic, this may be indicated to a user in various ways. For instance, a visible watermark could be added to the video as an overlay before it is transmitted from the camera 2. Such a visible indication in the video may, however, be annoying to someone viewing the video and it may therefore be preferable to use other ways of indicating that the video has been found to be authentic. As an alternative, a digital signature may be used for making the indication. The digital signature may be stored as metadata in a header of the image frames when they are encoded before transmission from the camera 2. One signature may be used for indicating that the video has been determined to be authentic and another signature may be used for indicating that the video has been determined to be inauthentic. A third or no signature may be used when the outcome of the authentication is inconclusive.

Figure 5:
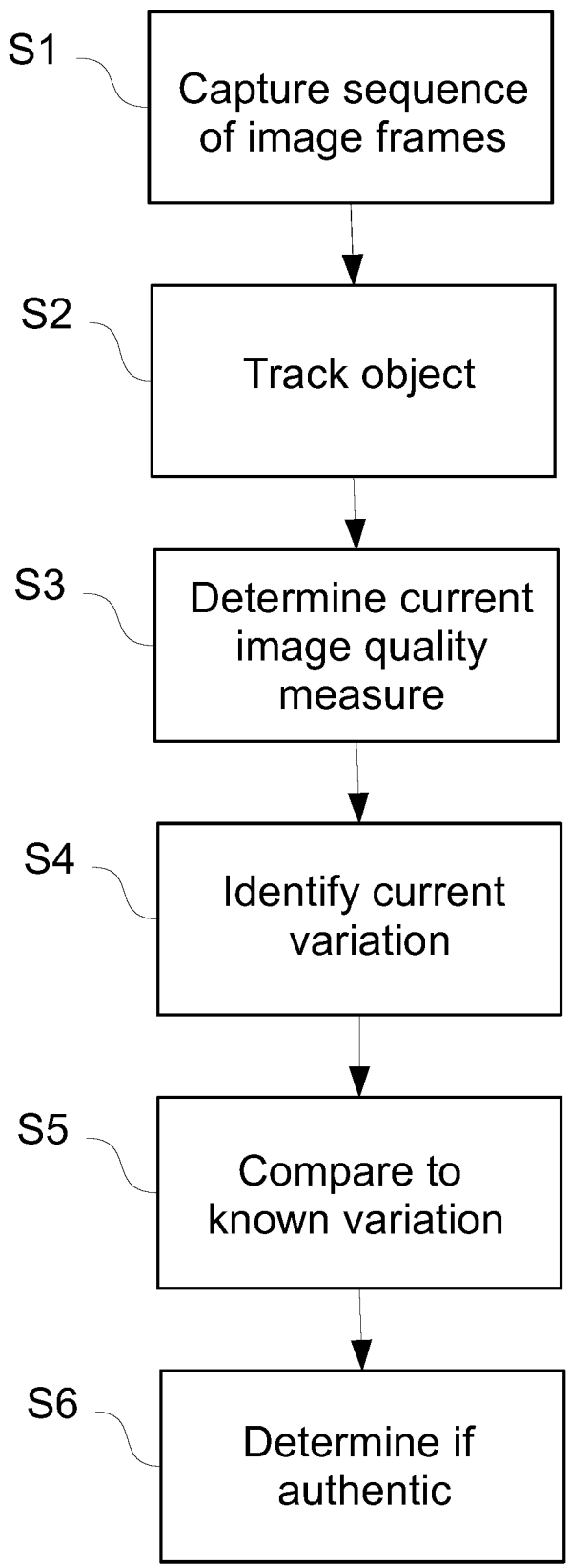
FIG. 5 is a flow chart illustrating a variant of the method.

In an effort to summarise the method, an example will now be described with reference to the flowchart in FIG. 5. In step S1, a sequence of image frames is captured. In step S2, an object is tracked in the captured image frames. In step S3, in image areas corresponding to the tracked object, a current image quality measure is determined in at least two image frames. These two image frames are chosen such that the object has moved at least a predetermined distance between the two frames. In step S4, a current image quality variation is identified. In other words, it is identified how the current image quality measure varies as a function of the position of the object in the at least two image frames. In step S5, the identified image quality measure variation is compared to a known image quality measure variation, i.e., a variation that is expected based on knowledge of the camera and based on the positions of the tracked object in the at least two images. If it is found that the current image quality measure variation differs little from the known variation, i.e., it differs by less than a first predetermined amount, it is determined in step S6 that the video sequence is authentic. As discussed above, what happens if it is found that the current image quality measure variation differs from the known variation by more than the first predetermined amount can be set up in different ways.

Figure 6:
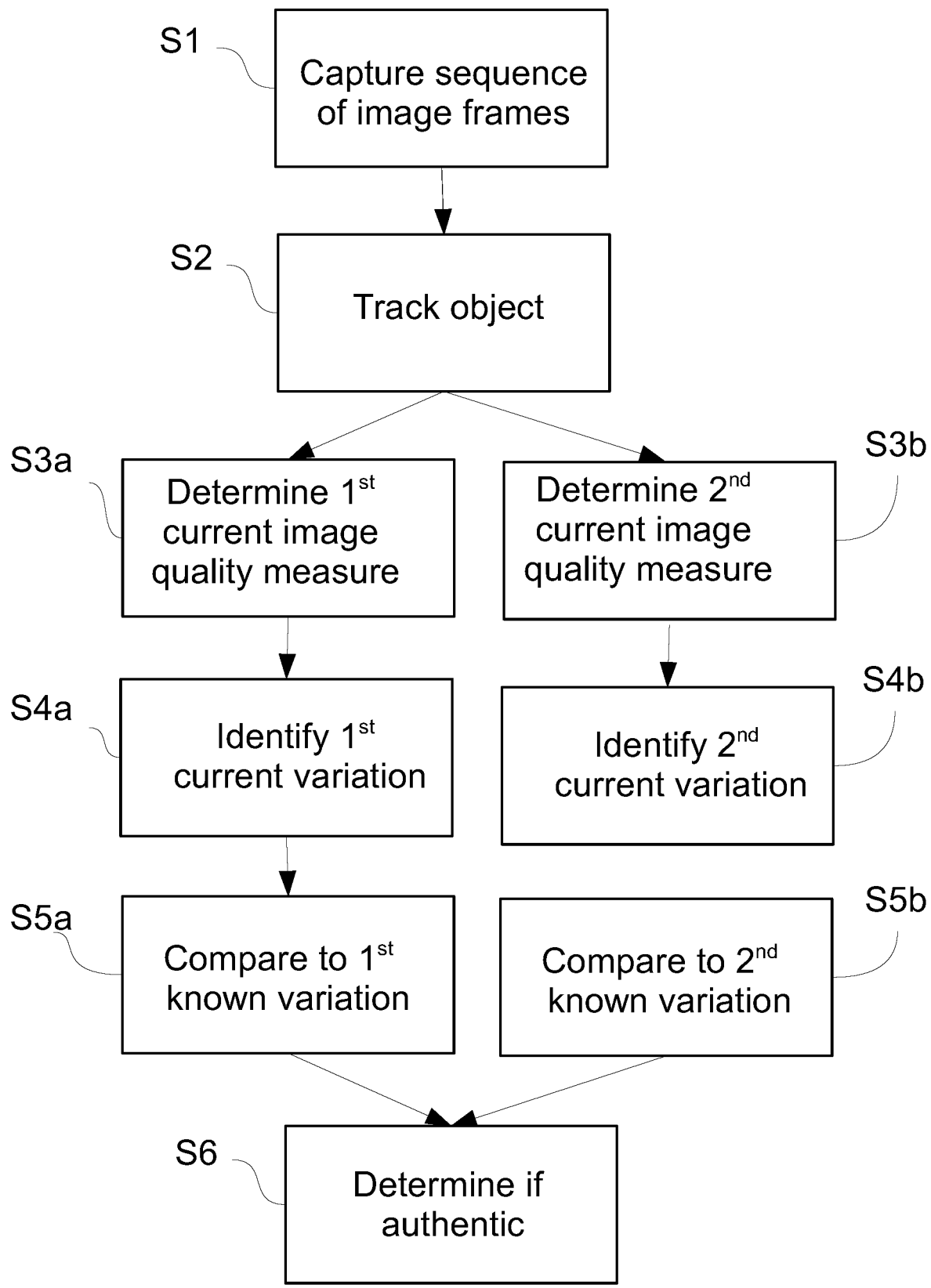
FIG. 6 is a flow chart illustrating another variant of the method.

With reference to FIG. 6, a modification of the method described in relation to FIG. 4 will now be described. This modification may make the method even more reliable. The first two steps are the same as before, such that in step S1 a sequence of image frames is captured and in step S2 an object is tracked in the image frames. The method is then modified in that two different image quality measures are determined. For instance, both pixel contrast and pixel range fill may be determined. Thus, in step S3a, a first image quality measure is determined in an image area corresponding to the tracked object and in step S3b, a second image quality measure is determined in the image area corresponding to the tracked object. For each image quality measure, the same process as described before follows. Therefore, in step S4a, a first image quality measure variation is identified describing how the first image quality measures varies as a function of the position of the tracked object, and in step S4b, a second image quality measure variation is identified describing how the second image quality measure varies as a function of the position of the tracked object. In step S5a, the first image quality measure variation is compared to a known variation for this first image quality measure and in step S5b, the second image quality measure variation is compared to a known variation of the second image quality measure. If both current image quality measure variations are similar enough to the respective known variations, it is in step S6 determined that the video is authentic. If, on the other hand, either of the first and second image quality measures differs from the respective known variation by more than a predetermined amount, it is not determined that the video is authentic. Should, for instance, the first current image quality measure differ from the first known image quality variation by more than a first predetermined amount and the second current image quality measure be sufficiently similar to the second known image quality it may be determined that the outcome is inconclusive. Should both current image quality measure variations differ significantly from the known image quality measure variations, it may be determined that the video sequence is likely inauthentic or fake. Even if a video were displayed in front of the camera having by chance or skill a behaviour that corresponds well to a known variation of one image quality measure, the likelihood that also a known variation of another image quality measure could be emulated is low. Therefore, the authentication may be made more resilient and reliable by studying more than one image quality measure variation. A variant of this may be to have a set of image quality measures to pick from when performing the authentication method. The image quality measure to determine may be picked at random. Thereby, computing resources may be saved in that only one image quality measure need be studied for each video sequence, while still making it more difficult to trick the authentication method, as that would require mimicking the behaviour of several image quality measures.

The authentication of the video sequence may be made in the camera 2 before the camera 2 transmits the video. However, there may be situations where it is desirable to perform the authentication later, after the video sequence has been transmitted from the camera 2. This may for example be of interest if the camera has limited computing resources. This may also be of interest in scenarios where authentication is not needed for all video sequences captured by the camera 2 but only a few. Most of the time, captured video may not be of particular interest, but if a crime has been committed in the monitored scene, video captured at the time of the crime may be of forensic value and it may be necessary to determine if that video is trustworthy. A way of saving time and resources for computing in the camera 2 while still providing the possibility of determining the authenticity of a video sequence is to divide the authentication method between different devices. Thus, the first steps of the method may be performed on the camera 2, such that the camera captures images, tracks an object in the images and determines a current image quality measure in the image areas corresponding to the tracked object. For each image frame, the current image quality measure may be stored in the video sequence, e.g., in a header created when encoding the image frames. The video sequence may then be transmitted from the camera 2 to a control centre or other place where it may be viewed in real time and/or recorded. The method may be continued at the place of receipt of the video sequence, either directly when the video sequence is received or at some later point after it has been recorded. Thus, in the control centre, or elsewhere, the data stored in the video sequence regarding the current image quality measure may be retrieved. A current image quality measure variation can then be identified based on the retrieved image quality measure data and this variation can be compared to a known image quality measure variation in the same way as has been described above. Just as before, it is determined that the video sequence is authentic if the current image quality measure variation differs from the known image quality measure variation by less than the first predetermined amount. In the same way as discussed above, other outcomes of the comparison may also be indicated.

In the description so far, the image quality measure discussed has mainly been focus. However, the same approach may be used with other image quality measures, such as pixel contrast, motion blur, pixel range fill, and noise level. Methods of determining these image quality measures are known to the skilled person and will therefore only be discussed briefly.

Focus may be measured as the local sharpness of edges in the image. It varies with the distance from the focus centre.

Pixel contrast may be measured as a general local contrast, calculating a difference between the value of one pixel and the values of surrounding pixels. This measure is closely related to the angular resolution in the image. Pixel contrast varies with the distance from the camera to the object, as well as with the angle between the camera and the object.

Motion blur measures how blurred moving objects in the image are. Measuring motion blur may be done by estimating a point spread function of the blurring. Motion blur varies with the speed of the object but is expected to be the same regardless of the distance from the camera to the object.

Pixel range fill is a measure of how well local pixels fill up an available range of pixel values. This may be measured for, e.g., a neighbourhood of 32×32 pixels. The range of pixel values may for instance be 0-255 in an 8-bit representation. The pixel range is governed by local tone mapping used in image processing in the camera. Thus, when an object moves into a particular image area, the pixel range fill is expected to be the same regardless of the distance from the camera to the object.

Noise level may be measured as a local amount of temporal or spatial noise. It will differ between moving and stationary objects and between different light levels. However, if two or more objects are moving simultaneously, the noise levels are expected to be the same.

The skilled person will realise that there may be additional image quality measures that can be studied as long as their expected variation as a function of object position in image frames can be found. The known variation of a respective image quality measure may be determined theoretically or mathematically based on knowledge of parameters of the camera and of components of the camera, such as the lens. Alternatively, the known variation may be determined empirically, by having an object move around in the scene, capturing an image sequence of the object, and identifying the variation as a function of object position.

Figure 7:
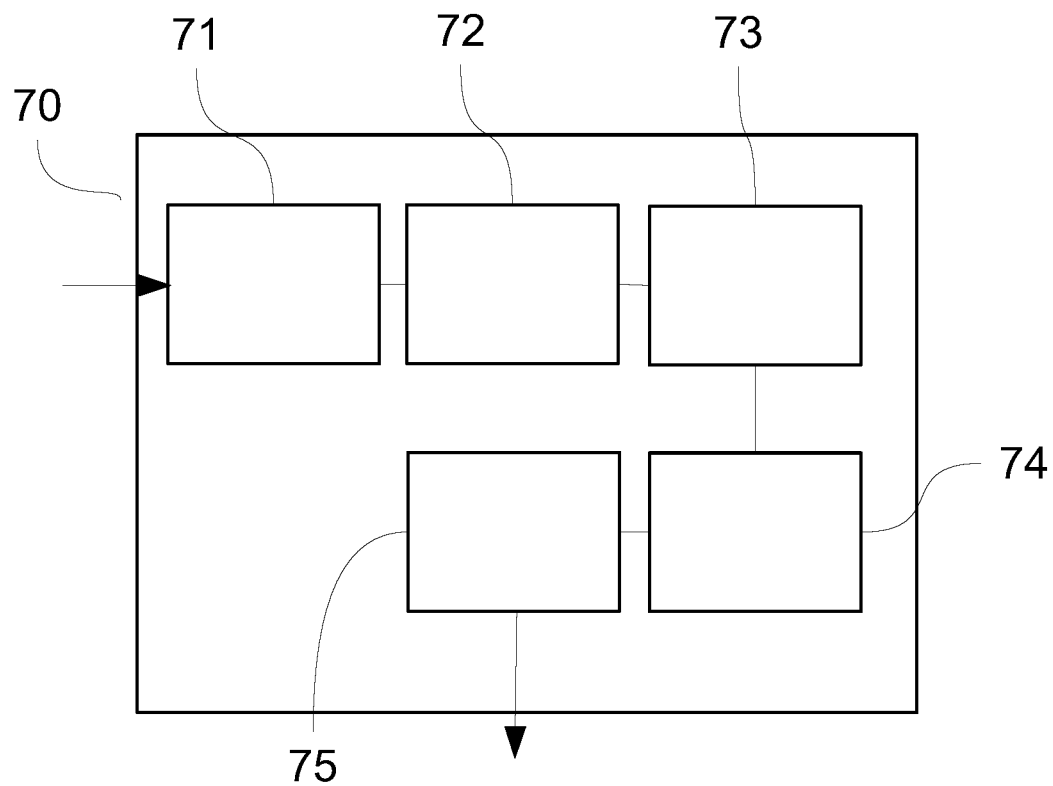
FIG. 7 is a block diagram showing an embodiment of the authenticator system.

FIG. 7 schematically shows an embodiment of the authenticator system 70 for determining authenticity of a video in a surveillance system. This system comprises circuitry for performing a number of functions generally in line with what has already been described above. The authenticator system has circuitry configured to execute a capturing function 71 configured to capture a sequence of image frames of a scene. The authenticator system circuitry is also configured to execute a tracking function 72 configured to track the object in the sequence of image frames. Furthermore, circuitry of the authenticator system is configured to execute a determining function 73 configured to determine a current image quality measure in an image area corresponding to the tracked object in at least a first image frame and a second image frame of the image frames in which the object is tracked, wherein the first and second image frames are chosen such that the object has moved at least a predetermined distance between the first and second image frames. Additionally, circuitry is configured to execute an identifying function 74 configured to identify a current image quality measure variation for the object from the determined image quality measure in the first image frame and the second image frame, and a comparing function 75 configured to compare the current image quality measure variation to a known image quality measure variation. In response to the current image quality measure variation deviating from the known pixel density variation by less than a first predetermined amount, the authenticator system is configured to determine that the video is authentic. The authenticator system 70 may operate in accordance with the methods described above.

Figure 8:
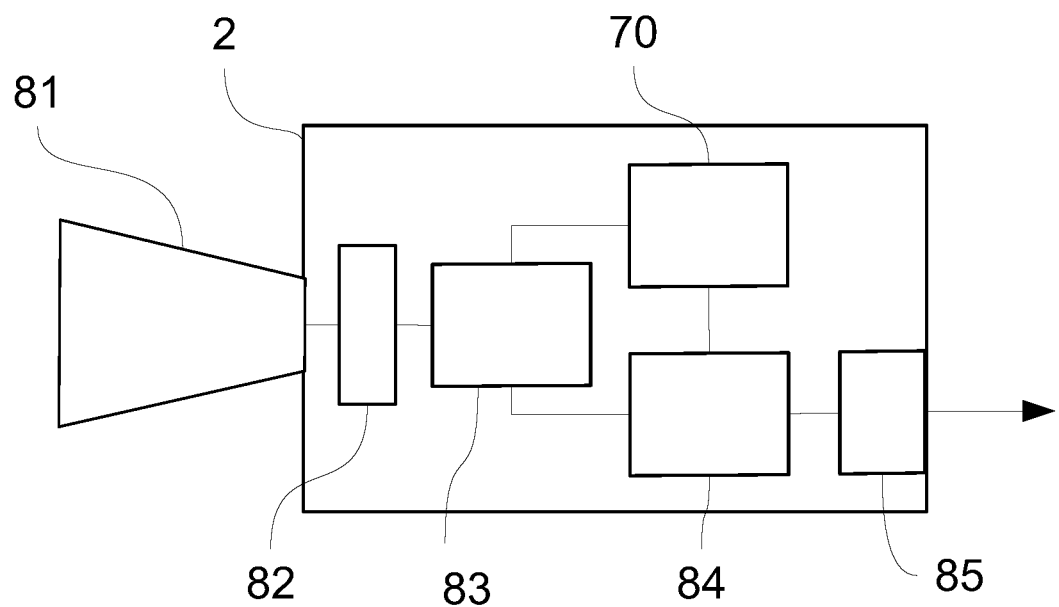
FIG. 8 is a block diagram of a camera comprising an authenticator system such as the one in FIG. 7.

In FIG. 8, an example of a camera 2 is shown. The camera has several components known per se but only the ones particularly relevant to the current concept will be described here. The camera 2 has a lens 81 and an image sensor 82 for capturing images of a scene it is monitoring, such as the scene 1 shown in FIGS. 1 and 2. Furthermore, the camera 2 includes an image processor 83, an encoder 84, and a network interface 85. Integrated in the camera 2 is an authenticator system 70 such as the one shown in FIG. 7.

It will be appreciated that a person skilled in the art can modify the above described embodiments in many ways and still use the advantages as shown in the embodiments above. As an example, the method may very well be combined with other authentication methods, such as digital signatures discussed in the background section. This would make it possible to ascertain a chain of authenticity, from the captured scene to the point of receipt of the transmitted video.

If there is more than one object moving in the image frames, it would be possible to increase the reliability of the authentication by evaluating the image quality measure for two or more tracked objects, particularly if the objects are moving along different trajectories. If all such evaluations indicate that the difference between the current image quality measure and the known image quality measure is less than the first predetermined amount it may be determined that the vide sequence is authentic, but if at least one of the current image quality measure variations varies by more than the first predetermined amount it may be determined that the video sequence cannot be authenticated or even that it is potentially fake.

In the examples above, the camera uses visible light for capturing images. The visible light camera may comprise a CCD or CMOS image sensor. However, the same principle may be used for other types of cameras, such as IR cameras.

The authenticator system has above been described as being integrated in a camera. Still, it would be possible to provide the authenticator system as a separate device, connected to the camera. In embodiments where the authentication method is split between two or more devices, parts of the authenticator system may be integrated in the camera or directly connected to the camera and other parts may be arranged remotely from the camera, e.g., in a control centre where video transmitted from the camera is received.

Although the camera in the examples above is a digital camera, the concepts may be used to advantage also with an analogue camera connected to a digitalisation unit. It is to be understood that the illustrated and disclosed components in FIGS. 7 and 8 may be implemented as hardware, software, or a combination thereof.

In a hardware implementation of a component, the component may correspond to circuitry which is dedicated and specifically designed to provide functionality of the part. The circuitry may be in the form of one or more integrated circuits, such as one or more application specific integrated circuits or one or more field-programmable gate arrays.

In a software implementation of a component, the circuitry may instead be in the form of a processor, such as a microprocessor, which in association with computer code instructions stored on a (non-transitory) computer-readable medium, such as a non-volatile memory, causes a processor to carry out (part of) any method disclosed herein. Examples of non-volatile memory include read-only memory, flash memory, ferroelectric RAM, magnetic computer storage devices, optical discs, and the like. For example, in a software case, the authenticator system may correspond to a portion of computer code instructions stored on the computer-readable medium, that, when executed by the processor, causes a processor, in the camera or elsewhere, to carry out the functionality of the component.

When the description is set forth as embodied in software, the programme code may be executed by any kind of processor, e.g., a central processing unit (CPU), a graphics processing unit (GPU), a custom made processing device implemented in an integrated circuit, an ASIC, an FPGA, or logical circuitry including discrete components.

Thus, the concepts should not be limited to the shown embodiments but should only be defined by the appended claims.

The invention claimed is:

1. A method for determining authenticity of a video in a surveillance system,
the method comprising:
capturing a sequence of image frames of a scene,
tracking an object in the sequence of image frames,
choosing from the sequence of image frames a first image frame and a second image frame based on an object identified in the first image frame having moved at least a predetermined distance between the first image frame and the second image frame,
determining a current image quality measure in an image area corresponding to the tracked object in at least the first image frame and the second image frame of the image frames in which the object is tracked,
identifying a current image quality measure variation for the object from the determined current image quality measure in the first image frame and the second image frame, the image quality measure variation describing the determined current image quality measure as a function of position of the object in the first and second image frames,
comparing the current image quality measure variation to a known image quality measure variation, and
in response to the current image quality measure variation deviating from the known image quality measure variation by less than a first predetermined amount, determining that the video is authentic,
wherein the determined current image quality measure is at least one from a group consisting of pixel contrast, focus, motion blur, pixel range fill, and noise level.

2. The method according to claim 1, wherein the current image quality measure variation is identified from the determined current image quality measure in three or more image frames, including the first and second image frames.

3. The method according to claim 1, wherein
the step of determining a current image quality measure in an image area corresponding to the tracked object comprises determining a first current image quality measure and a second current image quality measure, the second current image quality measure being different from the first current image quality measure,
the step of identifying a current image quality measure variation comprises identifying a first current image quality measure variation from the first determined image quality measure in the first image frame and the second image frame and identifying a second current image quality measure variation from the second determined image quality measure in the first image frame and the second image frame, and
the step of comparing the current image quality measure variation to a known image quality measure variation comprises comparing the first current image quality measure variation to a first known image quality measure variation and comparing the second current image quality measure variation to a second known image quality measure variation.

4. The method according to claim 1, wherein in response to the current image quality measure variation deviating from the known image quality measure variation by more than a second predetermined amount, issuing an alert indicative of a possible replayed video attack.

5. The method according to claim 1, further comprising storing the determined current image quality measure in the sequence of image frames.

6. The method according to claim 5, wherein the determined current image quality measure is stored in a header of a respective image frame.

7. The method according to claim 5, further comprising: storing the video sequence,
retrieving the stored video sequence, and
performing the step of comparing the current image quality measure variation to a known image quality measure variation on the retrieved video sequence.

8. The method according to claim 1, further comprising
in response to determining that the video is authentic, applying a first signature to the video sequence, and
in response to not determining that the video is authentic, applying a second signature to the video sequence, the second signature being different from the first signature.

9. An authenticator system for determining authenticity of a video in a surveillance system, the system comprising circuitry configured to execute:
a capturing function configured to capture a sequence of image frames of a scene,
a tracking function configured to track the object in the sequence of image frames,
a choosing function configured to choose from the sequence of image frames a first image frame and a second image frame based on an object identified in the first image frame having moved at least a predetermined distance between the first image frame and the second image frame,
a determining function configured to determine a current image quality measure in an image area corresponding to the tracked object in at least the first image frame and the second image frame of the image frames in which the object is tracked,
an identifying function configured to identify a current image quality measure variation for the object from the determined current image quality measure in the first image frame and the second image frame, and
a comparing function configured to compare the current image quality measure variation to a known image quality measure variation, and
in response to the current image quality measure variation deviating from the known pixel density variation by less than a first predetermined amount, determining that the video is authentic,
wherein the determined current image quality measure is at least one from a group consisting of pixel contrast, focus, motion blur, pixel range fill, and noise level.

10. The authenticator system according to claim 9, wherein the identifying function is configured to identify the current image quality measure variation from the determined current image quality measure in three or more image frames, including the first and second image frames.

11. The authenticator system according to claim 9, further comprising a storing function configured to store the determined current image quality measures in the video sequence.

12. A camera including an authenticator system for determining authenticity of a video in a surveillance system, the system comprising circuitry configured to execute:
a capturing function configured to capture a sequence of image frames of a scene,
a tracking function configured to track the object in the sequence of image frames,
a choosing function configured to choose from the sequence of image frames a first image frame and a second image frame based on an object identified in the first image frame having moved at least a predetermined distance between the first image frame and the second image frame,
a determining function configured to determine a current image quality measure in an image area corresponding to the tracked object in at least the first image frame and the second image frame of the image frames in which the object is tracked,
an identifying function configured to identify a current image quality measure variation for the object from the determined current image quality measure in the first image frame and the second image frame, and
a comparing function configured to compare the determined current image quality measure variation to a known image quality measure variation, and
in response to the current image quality measure variation deviating from the known pixel density variation by less than a first predetermined amount, determining that the video is authentic,
wherein the determined current image quality measure is at least one from a group consisting of pixel contrast, focus, motion blur, pixel range fill, and noise level.

13. A non-transitory computer readable storage medium having stored thereon instructions for implementing a method, when executed on a device having processing capabilities, for determining authenticity of a video in a surveillance system, the method comprising:
capturing a sequence of image frames of a scene,
tracking an object in the sequence of image frames,
choosing from the sequence of image frames a first image frame and a second image frame based on an object identified in the first image frame having moved at least a predetermined distance between the first image frame and the second image frame,
determining a current image quality measure in an image area corresponding to the tracked object in at least the first image frame and the second image frame of the image frames in which the object is tracked,
identifying a current image quality measure variation for the object from the determined current image quality measure in the first image frame and the second image frame, the image quality measure variation describing the image quality measure as a function of position of the object in the first and second image frames,
comparing the current image quality measure variation to a known image quality measure variation, and
in response to the current image quality measure variation deviating from the known image quality measure variation by less than a first predetermined amount, determining that the video is authentic,
wherein the determined current image quality measure is at least one from a group consisting of pixel contrast, focus, motion blur, pixel range fill, and noise level.

* * * * *